United States Patent Office 3,304,281
Patented Feb. 14, 1967

3,304,281
BLENDS OF RUBBERY POLYMERS
John H. Tucker, Norman, Okla., assignor to Phillips Petroleum Company, a corporation of Delaware
No Drawing. Filed Dec. 31, 1962, Ser. No. 248,198
3 Claims. (Cl. 260—33.6)

This invention relates to a method of blending rubbery polymers. In another aspect it relates to a rubbery composition in which polymers have been blended in such a manner as to provide improved properties in the final product. In another aspect it relates to a cured, rubbery polymeric blend having improved flex life.

In order to obtain desirable balances of properties in rubber, it has been found that various synthetic polymers or synthetic and natural rubber can be blended together with satisfactory results. Blends of polymers prepared in solution and in emulsion polymerizations provide compositions which are readily processable and have properties which suit them particularly for use in the manufacture of automobile tires. Heretofore, blends of this type have been made by mechanically mixing the finished polymers using roll mills, Banbury mixers, or the like, while incorporating oil and/or carbon black, if desired, during the operation. I have now discovered that quite unexpectedly, blends of rubbery polymers of this type can be prepared in such a manner as to greatly improve flex life of the cured composition. As an additional advantage, the polymer recovery processes are greatly simplified.

According to my invention, improved blends of rubbery polymers are obtained by mixing together a solution of one polymer with a latex of the other and then coagulating the rubber crumb from the resulting mixture. Polymers prepared by solution polymerization can be mixed directly with the latex obtained from an emulsion polymerization process without the necessity for separate recovery of each polymer. After mixing together the polymer solution and the latex, the solvent present in the polymer solution is stripped from the mixture. During this operation the mixture should be maintained under acid conditions. The rubber crumb which is precipitated is a homogeneous blend of the solution and emulsion polymerized rubbers. This polymeric blend when compounded and cured in a conventional manner has improved physical properties, particularly in increased flex life. The products of the invention are, therefore, highly useful for the manufacture of automobile tires and rubber gaskets or seals which are subject to repeated flexing in use.

It is an object of my invention to provide an improved method of blending rubbery polymers.

Another object of my invention is to provide an improved rubbery composition which is a blend of emulsion polymer and solution polymerized polymer.

Still another object is to provide a cured rubbery composition which is a blend of polymers and which has improved flex life.

Other objects, advantages and features of my invention will be apparent to those skilled in the art in the following discussion.

The rubbery polymers which are ordinarily used in preparing the blends of my invention are the synthetic polymers of conjugated dienes or natural rubber. The conjugated diene polymers include the homopolymers of conjugated dienes containing 4 to 8 carbon atoms per molecule, such as 1,3-butadiene, isoprene, piperylene, 1,3-octadiene and the like, as well as the copolymers of these conjugated dienes with each other or with other vinylidene-containing monomers. Such copolymers contain a major amount of the conjugated dienes with a minor amount of a different copolymerizable monomer containing a $CH_2=C<$ group. Examples of such copolymerizable monomers include styrene, vinylnaphthalene, 2-vinylpyridine, 2-methyl-5-vinylpyridine, 3-vinylquinoline, acrylonitrile, methyl methacrylate and the like. Ter-polymers can also be used with the provision that the conjugated diene is present in major amount for it is intended that the compositions of my invention be rubbery in nature.

Many methods of preparing rubbery polymers from the above-named monomers are well known, including both solution and emulsion processes. In the solution processes the polymer is formed in solution in an organic solvent which, under certain circumstances, can be the liquid monomer itself. Ordinarily the solevnt is an inert hydrocarbon, either paraffinic or aromatic in character, and containing about 4 to 12 carbon atoms per molecule. Examples of such solvents include n-pentane, cyclohexane, benzene, toluene, isooctane, n-dodecane and the like. In the solution processes many types of catalyst systems can be used among which are the combinations of aluminum alkyls and titanium halides, for example triisobutyl-aluminum and titanium tetraiodide, or the organolithium systems, such as n-butyllithium or dilithium adducts of methylnaphthalene. An intermediate product of these processes is a solution of the rubber in the organic solvent, ordinarily in a concentration of about 1 to 20 weight percent rubber. Such solutions can be used directly in the blending operation with the latex or the concentration of the polymer can first be adjusted by dilution or evaporation of some of the solvent. It is preferred that the solution which is used for blending with the latex contain about 3 to 15 weight percent polymer. With the higher concentrations of polymer in the solution, more vigorous mixing is required to obtain adequate dispersion in the latex.

The latex used in the blending operation is a stable emulsion of rubbery polymer in an aqueous medium. Natural rubber latex can be used or the latex which is formed in the emulsion polymerization of conjugated diene is suitable. These emulsion polymerization processes are well known in the art. The latex produced ordinarily contains dispersants and emulsifiers. Such a latex frequently contains between 15 and 60 weight percent rubber solids and can be used in this form in the blending operation. It is preferred, however, for maximum efficiency that the latex contain not over 50 percent by weight rubber solids in the aqueous medium.

The ratio of polymer solution to latex is determined by the relative concentrations of rubber solids in each system and by the desired ratio of the polymers in the resulting blend. These blends can cover a broad range of relative proportions of each polymer, for example, ranging from about 5 to 95 parts by weight of solution polymer in 100 parts by weight of the total blend. It should be understood that the process can be used for blending the latices from one or more emulsion polymerizations with one or more solutions of polymer or polymer solutions with a combination of a synthetic natural rubber latex. The procedure would be the same and the latices and solutions can be premixed before combination or all of the components can be added and mixed together simultaneously.

The invention is especially useful in the blending of cis-polybutadiene with emulsion polymerized butadiene-styrene rubber (SBR). By "cis-polybutadiene" I refer to those homopolymers of 1,3-butadiene which are prepared with stereo-specific catalysts such as triisobutylaluminum and titanium tetraiodide and which contain at least 75 percent cis 1,4-configuration. Ordinarily such polymers have a cis content between about 90 and 100 percent. The configuration of these polymers can be determined with infrared analysis using a solution containing 25 grams of polymer per liter of carbon disulfide solution.

The percent of the total unsaturation present as trans 1,4- is calculated according to the following equation and consistent units: $\epsilon = E/tc$ where $E$=extinction coefficient (liters-mols$^{-1}$-centimeters$^{-1}$); E=extinction (log $I_0/I$); $t$=path length (centimeters); and c.=concentration (mols double bond/liter). The extinction is determined at the 10.35 micron band and the extinction coefficient is 146 (liters-mols$^{-1}$-centimeters$^{-1}$). The percent of the total unsaturation present as 1,2-(or vinyl) is calculated according to the above equation, using the 11.0 micron band and an extinction coefficient of 209 (liters-mols$^{-1}$-centimeters$^{-1}$). The percent of the total unsaturation present as cis 1,4- is obtained by subtracting the trans 1,4- and 1,2-(vinyl) determined according to the above procedure from the theoretical unsaturation, assuming one double bond per each $C_4$ unit in the polymer.

As an additional advantage in the process, the mixing of the polymer solution and latex can be used to incorporate an oil and/or carbon black into the polymer. Preferably, the oil masterbatches are prepared by introducing the oil as an aqueous emulsion. This oil emulsion can be mixed with the latex prior to contact with the solution polymer or all three components can be mixed simultaneously either in a feedstream to the process or in a mixing vessel. In the preparation of a black masterbatch, the carbon black is added as a slurry in water, generally with a suitable wetting agent. The black slurry can be added to the solution-latex mixture or it can be mixed with the latex prior to its contact with the solution. In a preferred method of operating, the latex and the solution are mixed continuously in a mechanical disperser and fed directly into a stripping vessel. Agitation producing high shear is desirable and this can be accomplished in conventional equipment such as a blade mixer or centrifugal pump. I have found that prolonged agitation is not desirable as the polymer tends to swell, making pumping of the mixture difficult. For this reason the rapid mixing of the solution and latex immediately before it is fed to the stripper is most desirable.

After the polymer solution and latex are thoroughly mixed, the mixture is treated for removal of the solvent present and coagulation of the rubber. This can be done in a stripping vessel wherein the organic solvent is vaporized along with some of the water from the latex and removed overhead. The mixture is maintained under acid conditions, preferably with a pH below about 4, more preferably between about 2 and 3. The coagulation of the polymer is effected by using acid-brine or glue-acid means or by acid alone. While other acids can be used, sulfuric acid is a convenient reagent for this purpose. While stripping the mixture under acid conditions, the polymer precipitates as a homogeneous blend and can be recovered as a rubber crumb, washed and dried in a conventional manner.

In order to illustrate further the advantages of my invention, the following example is presented. The conditions and proportions are typical only and should not be construed to limit my invention unduly:

*Example*

A solution of cis-polybutadiene and toluene was mixed with a latex-oil masterbatch obtained by blending a latex of an emulsion-polymerized butadiene-styrene copolymer and a highly aromatic extender oil. The cis-polybutadiene had a cis content of about 90 percent and a Mooney value (ML–4 @ 212° F.) of 46. The butadiene-styrene copolymer contained 24 weight percent styrene and had a Mooney value of 56. The latex was mixed with an emulsion of the oil and then combined with the cis-polybutadiene solution in a mechanical disperser. The resulting mixture was conveyed to a 250-gallon solvent stripper where the toluene and some of the water were removed overhead by steam stripping while maintaining the pH of the mixture between 2.0 and 2.2 by the addition of the sulfuric acid. Rubber crumb was recovered from the stripping zone, washed and dried.

The latex blended polymer prepared as described above was compounded with carbon black and additional oil as shown in Recipe A in Table I. As a control, the butadiene-styrene copolymer (SBR) and the solution cis-polybutadiene were recovered separately and blended together on the mill. The recipe for the mill blend is shown as Recipe B in Table I. Each of the compositions obtained from Recipes A and B contained 51.5 parts by weight of butadiene-styrene emulsion copolymer, 48.5 parts of solution cis-polybutadiene and 37.5 parts of extender oil, each per 100 parts by weight of total polymer (cis-polybutadiene plus butadiene-styrene polymer). The compositions of Recipes A and B had a compounded Mooney value (MS–1½ @ 212° F.) of 33.5 and 32.4, respectively.

TABLE I

|  | Parts by Weight | |
| --- | --- | --- |
|  | A | B |
| Latex-solution blended polymer [1] | 119.2 |  |
| Emulsion SBR [2] |  | 71.5 |
| Solution cis-polybutadiene |  | 48.5 |
| High abrasion furnace black | 68 | 68 |
| Zinc oxide | 3 | 3 |
| Stearic acid | 2 | 2 |
| Flexamine [3] | 1 | 1 |
| Highly aromatic oil | 18.3 | 17.5 |
| Sulfur | 2 | 2 |
| NOBS Special [4] | 1.1 | 1.1 |

[1] Blend containing 51.5 parts of SBR, 48.5 parts of cis-polybutadiene, and 19.2 parts of oil per 100 parts total polymer.
[2] Masterbatch containing SBR and oil in a weight ratio of 51.5/20.0.
[3] Physical mixture containing 65 percent of a complex diarylamine-ketone reaction product and 35 percent of N,N'-diphenyl-p-phenylenediamine.
[4] N-oxydiethylene-2-benzothiazylsulfenamide.

The compositions were each cured for 30 minutes at 307° F. The physical properties of both the latex solution blend and the mill blend were comparable with the exception of the flex life in which the latex-solution blend exhibited 72½ percent improvement over the flex life of the mill blend as shown in Table II.

TABLE II

|  | Latex-solution Blend | Mill Blend |
| --- | --- | --- |
| Flex life, M [1] | 16.7 | 9.7 |

[1] Thousands of flexures to failure. DeMattia flex life, ASTM D-813-57T using a specimen ¼" thick, 3" wide and 6" long.

As can be seen from the above, highly improved flex life in the rubbery blends can be obtained by combining the polymers in physical mixture according to my invention. The process also obviates the necessity for separate recovery of the solution and emulsion polymers.

As will be apparent to those skilled in the art, various modifications can be made in my invention without departing from the spirit or scope thereof.

I claim:
1. A method of blending a solution polymerized rubber of cis-polybutadiene having a cis content of at least 75 percent with an emulsion polymerized rubber, said emulsion rubber being selected from the group consisting of homopolymers of conjugated dienes containing 4 to 8 carbon atoms per molecule and copolymers of a major amount of said conjugated dienes with a minor amount of styrene, which comprises mixing together a polymer solution effluent stream from a solution polym- erization process and a latex stream from an emulsion polymerization process, immediately feeding the resulting mixture into a stripping zone wherein solvent is stripped from said mixture, maintaining said mixture in said stripping zone under acid conditions, and recovering a precipitated rubber crumb.

2. The method of claim 1 wherein a highly aromatic extender oil emulsion is combined with said mixture upstream from said stripping zone.

3. The method of claim 1 wherein a carbon black slurry is combined with said mixture upstream from said stripping zone.

References Cited by the Examiner

UNITED STATES PATENTS

| 2,953,556 | 9/1960 | Wolfe et al. | 260—41.5 |
| 2,986,547 | 5/1961 | Jefts et al. | 260—41 |

OTHER REFERENCES

"Compounding Cis-Polybutadiene," Brown et al., Rubber World, November 1961, pp. 70–75.

MORRIS LIEBMAN, *Primary Examiner.*

K. B. CLARKE, J. S. WALDRON, *Assistant Examiners.*